United States Patent
Fujii

[11] 3,997,248
[45] Dec. 14, 1976

[54] LARGE APERTURE TELEPHOTO LENS SYSTEM

[75] Inventor: Toru Fujii, Tama, Japan

[73] Assignee: Olympus Optical Co., Ltd., Tokyo, Japan

[22] Filed: Feb. 13, 1975

[21] Appl. No.: 549,480

[30] Foreign Application Priority Data

Feb. 14, 1974 Japan .............................. 49-17986

[52] U.S. Cl. ............................................... 350/215
[51] Int. Cl.² ............................................... G02B 9/62
[58] Field of Search ..................................... 350/215

[56] References Cited

UNITED STATES PATENTS 3,738,739   6/1973   Glatzel et al. ................... 350/215 X

FOREIGN PATENTS OR APPLICATIONS 1,244,437   7/1967   Germany ........................... 350/215

Primary Examiner—Paul A. Sacher
Attorney, Agent, or Firm—Cushman, Darby & Cushman

[57] ABSTRACT

A large-aperture telephoto lens system with high telephoto ratio wherein a negative thick meniscus lens is arranged in the rear lens group for correcting the negative spherical aberration and negative coma which are produced by the positive meniscus lenses with high refractive indices positioned on the object side.

2 Claims, 22 Drawing Figures

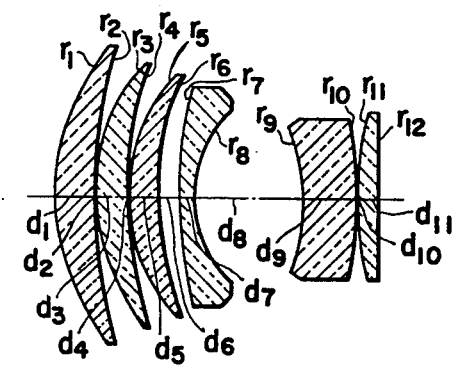
FIG. 1
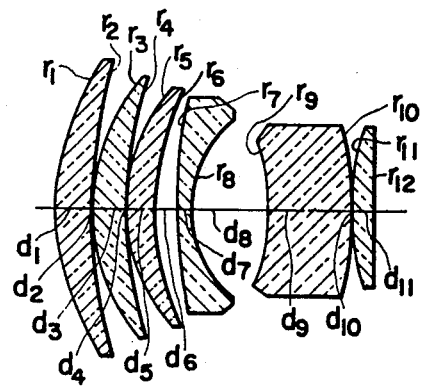
FIG. 2
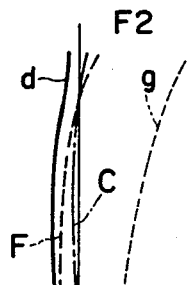
FIG. 3A SPHERICAL ABERRATION
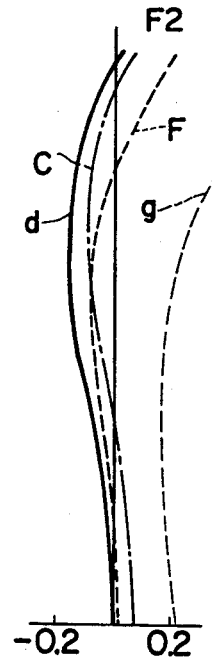
FIG. 3B SINE CONDITION
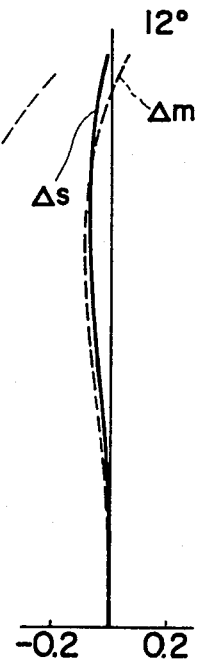
FIG. 3C ASTIGMATISM
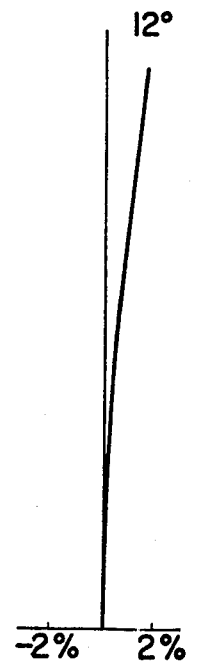
FIG. 3D DISTORTION

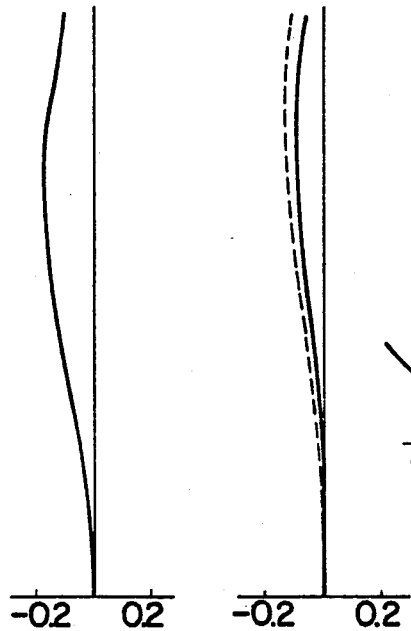
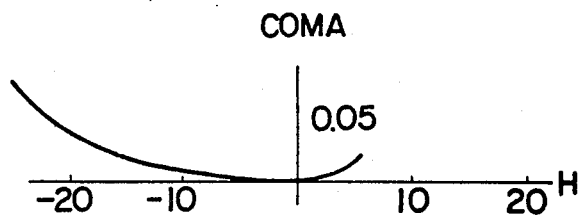
FIG. 4A SPHERICAL ABERRATION
FIG. 4B ASTIGMATISM
FIG. 4C COMA
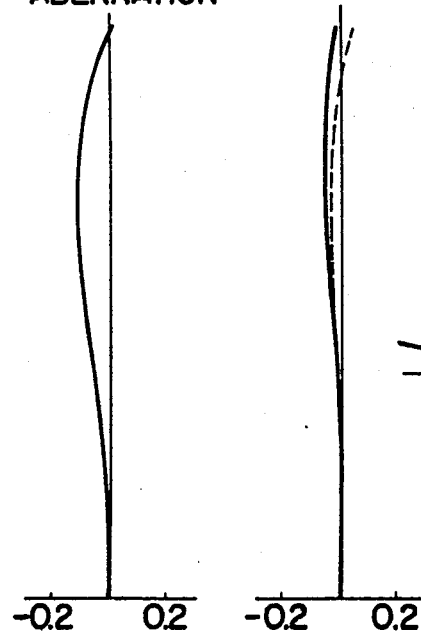
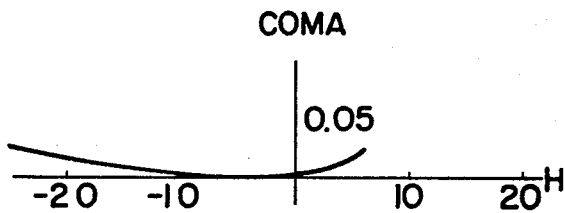
FIG. 5A SPHERICAL ABERRATION
FIG. 5B ASTIGMATISM
FIG. 5C COMA

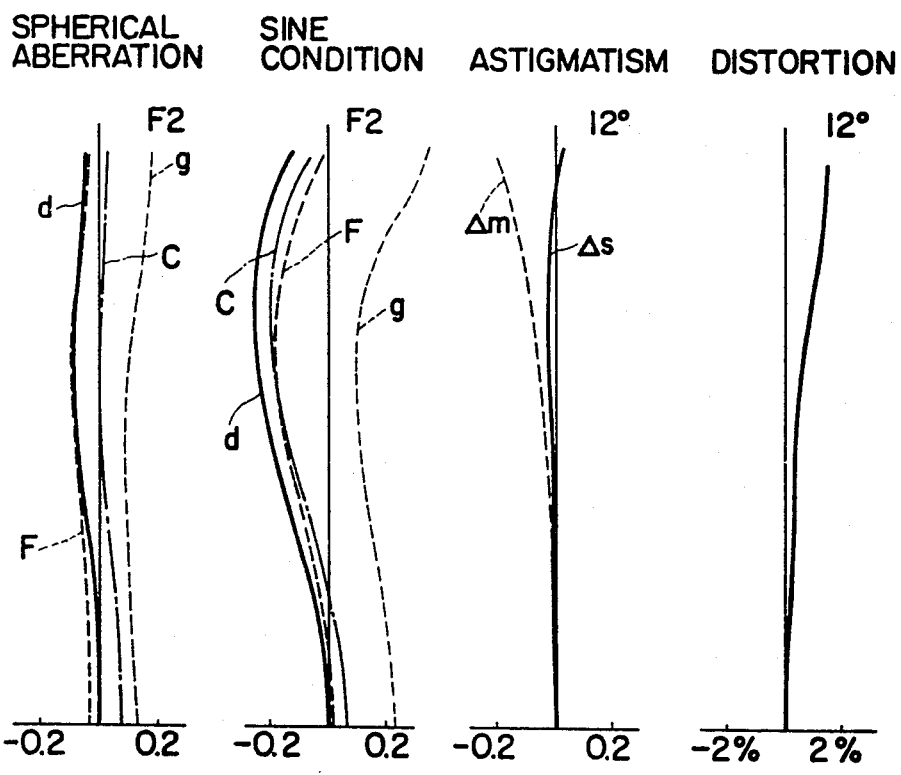

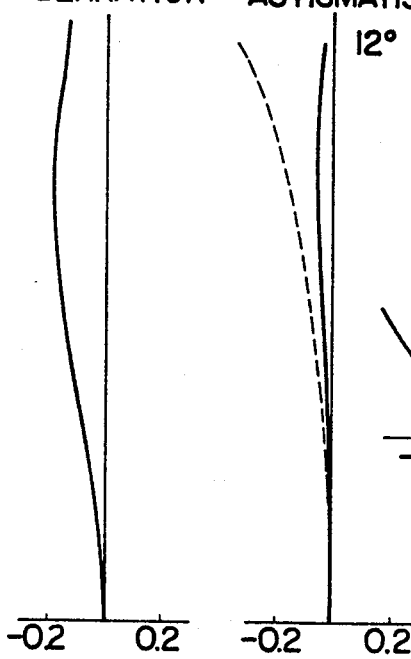
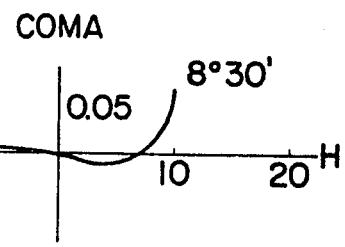
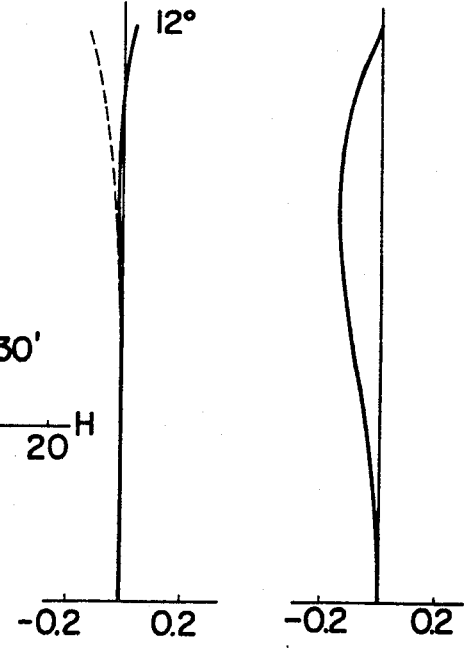
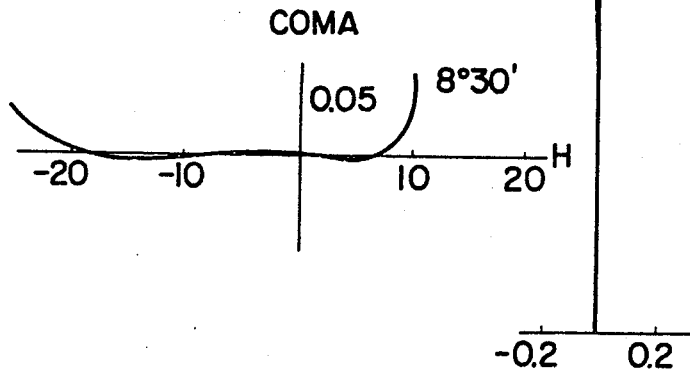

LARGE APERTURE TELEPHOTO LENS SYSTEM

BACKGROUND OF THE INVENTION a. Field of the Invention

The present invention relates to a compact telephoto lens with an aperture ratio of the order of F/2.0 and a telephoto ratio not exceeding 1.0.

b. Description of the Prior Art

In general telephoto lens systems with large apertures on the order of F/2.0, telephoto ratios can be reduced by enhancing the refractive powers of the front positive lens group. In case where the refractive power is enhanced by this method, however, negative spherical aberration is produced and, accordingly, there occurs an important problem to correct it by the rear lens group to such a degree that the lenses are usable with high aperture ratios.

Among lens systems of such a type, those disclosed by Japanese Pat. Publication Nos. 9468/1975 and 1586/1970 are well known to the public. However, these lens systems have some shortcomings in that they are high in telephoto ratio through being high in their aperture ratio, or that they are low in telephoto ratio but also low in aperture ratio. That is to say, the lens systems can not satisfy the requirements that high aperture ratio is obtainable in combination with a low telephoto ratio in one and the same lens system.

Further, in the above-mentioned type of telephoto lens systems with high aperture ratio, aberrations for short photographing distances are far more aggravated than for infinite photographing distance and this tendency is increased especially when telephoto ratio is selected at lower value. As a measure of favourably correct spherical aberration and curvature of field, it is sufficient to balance the aberrations well for infinite photographing distance. However, such a measure is ineffective to correct asymmetrical coma and therefore increases flare due to coma, thereby resulting in degradation in quality of the image.

SUMMARY OF THE INVENTION

In view of the foregoing, it is a primary object of the present invention to provide a telephoto lens system in which the refractive power of the front positive lens group is enhanced and the negative spherical aberration produced due to the front positive lens group having high refractive power is favourably corrected by arranging a very thick negative meniscus lens in the rear lens group.

Another object of the present invention is to provide telephoto lens systems adapted in such a way that said thick negative meniscus lens is movable along the optical axis in order to improve the qualities of images in photographing objects at short distances.

The lens system according to the present invention consists of a front lens group and a rear lens group which are arranged before and after a stop respectively. Said front lens group comprises a first positive meniscus lens, a second positive meniscus lens, a third positive meniscus lens and a fourth negative meniscus lens, while said rear lens group is composed of a fifth thick negative meniscus lens and a sixth biconvex lens. Each of said first, second, third and fourth meniscus lenses has a convex surface on the side of the object to be photographed, while said fifth negative meniscus lens has a concave surface on said object side. Furthermore, the telephoto lens systems according to the present invention can satisfy all the conditions enumerated below:

1. $0.9 < f_F/f < 1.4$
2. $n_1, n_2, n_3 > 1.61$
3. $0.3/f < 1/r_6 - 1/r_7 < 0.7/f$
4. $n_4, n_6 > 1.7, \nu_4, \nu_6 < 30$
5. $0.1f < d_5 + d_6 + d_7 < 0.12f$ (6) $0.15 < d_9/\sum_{i=1}^{9} d_i < 0.4$ 7. $0.55 < f_{Fb}/f_F < 0.7$ wherein the reference symbols denote as follows:

$f$: focal length of the entire lens system
$f_F$: focal length of the front lens group
$f_B$: focal length of the rear lens group
$f_{Fb}$: back focal length of the front lens group
$n_1, n_2, n_3, n_4$ and $n_6$: refractive indices of the first lens, second lens, third lens, fourth lens and sixth lens respectively
$\nu_4$ and $\nu_6$: Abbe's numbers of the fourth lens and sixth lens respectively
$r_7$ and $r_8$: radii of curvature on both surfaces of the fourth lens
$d_1, d_2, d_3, \ldots$: thicknesses of said lenses and air spaces consecutively Now, the characteristics of the telephoto lens system according to the present invention will be described especially with reference to the above-mentioned conditions: when a low telephoto ratio is selected in combination with a high aperture ratio in a telephoto lens systems of this type, there generally occurs a very difficult problem to take proper balancing between the correction of spherical aberration and that of curvature of field. Speaking more concretely, it is required to enhance the refractive powers of the positive lenses in the front group in order to select a low telephoto ratio, but such a requirement will generally aggravate the negative spherical aberration. For solving this problem, it is effective to enhance the refractive powers by increasing the refractive indices of the lenses in the front lens group since such a measure makes it possible to increase the radii of curvature of said lenses, thereby reducing the negative spherical aberration produced on each surface to a possible minimum value.

However, the above-described measure will reduce Petzval's sum of the front lens group to an extremely small value when it is considered independently, and, as a result, bring Petzval's sum of the entire lens system to a highly negative value, thus making it very difficult to favourably correct the curvature of field. The inventor has succeeded in favourably correcting said curvature of field by arranging a thick negative meniscus lens in the rear lens group. group. That is to say, a thick negative meniscus lens arranged in the rear lens group can correct the curvature of field enough satisfactorily while keeping the negative spherical aberration apt to be produced in the front lens group at a low level, and therefore permits to take a proper balance between said curvature of field and negative spherical aberration.

As is understood from the foregoing, it is highly effective to select a small value of $f_F$ for the front lens group relative to focal length $f$ of the entire lens system, but too small focal length $f_F$ makes it impossible to favourably correct the spherical aberration produced in the front lens group even if the refractive indices of the lenses in said lens group are enhanced as high as possible. It is therefore required to select the value of $f_F/f$ within the range defined as condition (1) for a front lens group comprising about three positive lenses as in the lens systems according to the present invention. That is, values of $f_F/f$ below the lower limit of 0.9 are undesirable for the reason described above. On the other hand, values of $f_F/f$ exceeding the upper limit of 1.4 will enhance the telephoto ratio and can not accomplish the object of the present invention.

Condition (2) is necessary for limiting the refractive indices $n_1$, $n_2$ and $n_3$ of the first, second and third positive lenses within a certain required range. For the reason which is already described above, it is effective to increase each of the refractive indices to 1.61 or higher for minimizing the spherical aberration.

Condition (3) is required for correcting asymmetrical aberration. Since the lens system according to the present invention is originally of Gauss type, it is so designed as to reduce the flare due to coma produced by the strongly concave surfaces on both sides of a stop (characteristic of Gauss lens) by utilizing the surfaces which are formed by separating a cemented surface, i.e., the image side surface $r_6$ of the third lens and object side surface $r_7$ of the fourth lens. If the difference between $1/r_6$ and $1/r_7$ is below the lower limit of $0.4/f$ in condition (3), the correcting actions on said two surfaces become too low to obtain sufficient effect. The difference exceeding the upper limit of $0.7/f$ is undesirable since it will aggravate asymmetrical aberration for lower rays.

The refractive index of the fourth lens is selected within the range specified by condition (4) so as to avoid selecting too small a Petzval's sum and to reduce positive spherical aberration produced by the stop side surface of this lens. Further, this condition permits widely moving the principal point of the front lens group forward and serves for lowering the telephoto ratio. Furthermore, it is effective to select the value of $\nu_4$ within the range (lower than 30) defined by condition (4) for correcting the longitudinal chromatic aberration produced by the convex lenses in the front lens group. If $\nu_4$ has a value of 30 or higher, we are obliged to select a larger values of $\nu_4$ for the convex lenses in the front group and such a selection forces us to reduce refractive indices of said lenses, thereby making it impossible to satisfy condition (2). That is to say, it becomes impossible to reduce the spherical aberration while keeping the telephoto ratio at a low value if $\nu_4$ has a value of 30 or higher.

The combination of the third and fourth lenses composes a negative lens. In order to properly correct coma, it is effective to control the total sum of thicknesses $d_5$ and $d_7$ of these lenses and thickness of $d_6$ the air space therebetween $(d_5 + d_6 + d_7)$ within the range defined as condition (5).

The front lens group constructed as decribed above has a telephoto ratio and focal distance which can almost accomplish the object of the present invention. The rear lens group of the telephoto lens systems according to the present invention is, on the other hand, so constructed as to have a low positive refractive power as a whole and characterized in that it comprises a very thick negative meniscus lens with a concave surface facing the stop as is already described above. The lens group of such a construction provides effective diverging action for lower rays. It can therefore effectively correct asymmetrical aberration for lower rays produced in the front lens group and bring the image point of offaxial rays in almost the best focus of spherical aberration. Let us now assume that the total thickness of the first through the fifth lenses and air spaces therebetween is designed by $$\sum_{i=1}^{9} d_i$$

and the thickness of the fifth lens is denoted by $d_9$. When the fifth lens is designed in such a way that the value of $$d_9 / \sum_{i=1}^{9} d_i$$

is smaller than the lower limit of 0.15 in condition (6), the above-mentioned actions of the rear lens group is reduced for the front lens group which is constructed as already described. When the value of $$d_9 / \sum_{i=1}^{9} d_i$$

exceeds the upper limit of 0.4, in contrast, it becomes required to extend the total length of the lens system for avoiding contacts between the lens elements and it is impossible to accomplish the object of the present invention to obtain a low telephoto ratio.

Since the sixth lens strongly serves for correcting lateral chromatic aberration, it is so designed as to have a high dispersive power satisfying condition (4). If value of $\nu_6$ is larger than 30, it will be impossible to correct the lateral chromatic aberration. Selecting a refractive index of 1.7 or higher is also effective for correcting astigmatism.

Although the lens system according to the present invention is low in their telephoto ratio but high in their aperture ratio, the performance of said lens system may be remarkably degraded for photographing object at short distances due to asymmetrical coma, deviation of spherical aberration toward negative side, etc. As a means for preventing such a performance degradation, it may be considered to preliminarly deviate the spherical aberration for infinite photographing distance toward the positive side. However, such a means is undesirable since it produces noticeable flare in photographing objects at infinite distance. The inventor has found out that the above-said performance degradation can be effectively prevented by moving the fifth lens along the optical axis in accordance with the distance to the object to be photographed and adopted this method in the present invention. For composing a telephoto lens system by this method, it is preferable to select back focal length of the front lens group within the range defined by condition (7) so that a value higher than 0.55 is imparted to $f_{Fb}/f_f$ which determines incident angle of the paraxial rays on the fifth lens. If $f_{Fb}/f_f$ has a value lower than 0.55, slight movement of the fifth lens will produce so large a variation in the spherical aberration that accurate control of moving distance can hardly be performed for the fifth lens. When $f_{Fb}/f_f$ has a value larger than 0.7, on the contrary, the spherical aberration can be varied only slightly by moving the fifth lens and, the fifth lens may be brought in contact with the fourth lens in order to sufficiently prevent the performance degradation. Values exceeding 0.7 are therefore undesirable for $f_{Fb}/f_F$.

BRIEF DESCRITPION OF THE DRAWINGS

FIG. 1 shows a sectional view illustrating the construction of a preferred embodiment of the present invention;

FIG. 2 is a sectional diagram illustrating the construction of another embodiment of the present invention;

FIGS. 3A, 3B, 3C, 3D, 4A, 4B, 4C, 5A, 5B and 5C respectively show graphs of aberration curves of the Embodiment 1 of the present invention; and FIGS. 6A, 6B, 6C, 6D, 7A, 7B, 7C, 8A, 8B and 8C respectively show graphs of aberration curves of the Embodiment 2 of the present invention.

DETAILED DESCRIPTION OF THE PREFERRED EMBODIMENTS

Embodiment 1
```
f = 100,   F/2.0
r₁ = 41.823
         d₁ = 7.00        n₁ = 1.62041    ν₁ = 60.27
r₂ = 119.125
         d₂ = 0.16
r₃ = 36.34
         d₃ = 5.50        n₂ = 1.6223     ν₂ = 53.2
r₄ = 68.521
         d₄ = 0.16
r₅ = 30.05
         d₅ = 5.00        n₃ = 1.62041    ν₃ = 60.27
r₆ = 49.039
         d₆ = 3.78
r₇ = 70.094
         d₇ = 2.20        n₄ = 1.78472    ν₄ = 25.71
r₈ = 18.224
         d₈ = 20.00
r₉ = −44.400
         d₉ = 9.49        n₅ = 1.64769    ν₅ = 33.8
r₁₀ = −74.931
         d₁₀ = 0.20
r₁₁ = 100.258
         d₁₁ = 3.51       n₆ = 1.7552     ν₆ = 27.51
r₁₂ = −216.912
         f_F = 123.314,   f_Fb = 72.891
         f_Fb/f_F = 0.5911
```

Embodiment 2
```
f = 100,   F/2.0
r₁ = 43.669
         d₁ = 7.00        n₁ = 1.618      ν₁ = 64.15
r₂ = 148.833
         d₂ = 0.16
r₃ = 37.683
         d₃ = 5.50        n₂ = 1.62041    ν₂ = 53.2
r₄ = 56.374
         d₄ = 0.16
r₅ = 25.842
         d₅ = 5.00        n₃ = 1.62041    ν₃ = 60.27
r₆ = 37.998
         d₆ = 3.78
r₇ = 43.64
         d₇ = 2.20        n₄ = 1.78472    ν₄ = 25.71
r₈ = 17.212
         d₈ = 15.00
r₉ = −56.712
         d₉ = 14.50       n₅ = 1.64769    ν₅ = 33.8
r₁₀ = −125.053
         d₁₀ = 0.20
r₁₁ = 75.814
         d₁₁ = 3.50       n₆ = 1.7552     ν₆ = 27.51
r₁₂ = 1352.567
         f_F = 110.797,   f_Fb = 66.062
         f_Fb/f_F = 0.5962
``` wherein the reference symbols represent as follows:

$r_1$ through $r_{12}$: radii of curvature on the surfaces of the first through sixth lenses $d_1$ through $d_{11}$: thicknesses of said lenses and air spaces therebetween $n_1$ through $n_6$: refractive indices of said lenses $\nu_1$ through $\nu_6$: Abbe's numbers of said lenses $f_F$: focal length of the entire front lens group $f_{Fb}$: back focal length of the rear lens group FIG. 3A through FIG. 3D show the aberrations of the embodiment 1 for infinite photographing distance; FIG. 4A through FIG. 4C show the aberrations of the embodiment 1 when magnification is set at 1/20 without moving the fifth lens; and FIG. 5A through FIG. 5C show the aberrations of the embodiment 1 when magnification is set at said value and the fifth lens is moved by 0.8 toward the object to be photographed. FIG. 6A through FIG. 6D show the aberrations of the embodiment 2 for infinite photographing distances: FIG. 7A through FIG. 7C shows the aberrations of the embodiment 2 when magnification is set at 1/20 without moving the fifth lens; and FIG. 8A through FIG. 8C show the aberrations of the embodiment 2 when magnification is set at the same value and the fifth lens is moved by 0.8 toward the object to be photographed.

As is clearly understood from these aberration curves, various aberrations are favourably corrected for infinite photographing distance and, in addition, those for short photographing distances are sufficiently minimized in the telephoto lens systems according to the present invention.

I claim:

1. A large aperture telephoto lens system comprising a front lens group and a rear lens group wherein said front lens group comprises a first positive meniscus lens, a second positive meniscus lens, a third positive meniscus lens and a fourth negative meniscus lens, and said rear lens group comprises a fifth thick negative meniscus lens with its concave surface positioned on the object side and a sixth positive lens, and said large aperture telephoto lens system having the following numerical data:

```
f=100,   F/2.0
r₁ = 41.623
         d₁=7.00          n₁=1.62041     ν₁=60.27
r₂ = 119.125
         d₂=0.16
r₃ = 36.34
         d₃=5.50          n₂=1.6223      ν₂=53.2
r₄ = 68.521
         d₄=0.16
r₅ = 30.05
         d₅=5.00          n₃=1.62041     ν₃=60.27
r₆ = 49.039
         d₆=3.78
r₇ = 70.094
         d₇=2.20          n₄=1.78472     ν₄=25.71
r₈ = 18.224
         d₈=20.00
r₉ = −44.400
         d₉=9.49          n₅=1.64769     ν₅=33.8
r₁₀ = −74.931
         d₁₀=0.20
r₁₁ = 100.258
         d₁₁=3.51         n₆=1.7552      ν₆=27.51
r₁₂ = −216.912
``` wherein the reference symbols represent as follows:

$r_1$ through $r_{12}$: radii of curvature on the surfaces of the first through sixth lenses $d_1$ through $d_{11}$: thicknesses of said lenses and air spaces therebetween $n_1$ through $n_6$: refractive indices of said lenses $\nu_1$ through $\nu_6$: Abbe's numbers of said lenses.

2. A large aperture telephoto lens system comprising a front lens group and a rear lens group wherein said front lens group comprises a first positive meniscus lens, a second positive meniscus lens, a third positive meniscus lens and a fourth negative meniscus lens, and said rear lens group comprises a fifth thick negative meniscus lens with its concave surface positioned on the object side and a sixth positive lens, and said large aperture telephoto lens system having the following numerical data:

$f = 1.00$, F/2.0

| | | |
|---|---|---|
| $r_1 = 43.669$ | | |
| $d_1 = 7.00$ | $n_1 = 1.618$ | $\nu_1 = 64.15$ |
| $r_2 = 148.833$ | | |
| $d_2 = 0.16$ | | |
| $r_3 = 37.683$ | | |
| $d_3 = 5.50$ | $n_2 = 1.62041$ | $\nu_2 = 53.2$ |
| $r_4 = 56.374$ | | |
| $d_4 = 0.16$ | | |
| $r_5 = 25.842$ | | |
| $d_5 = 5.00$ | $n_3 = 1.62041$ | $\nu_3 = 60.27$ |
| $r_6 = 37.998$ | | |
| $d_6 = 3.78$ | | |
| $r_7 = 43.64$ | | |
| $d_7 = 2.20$ | $n_4 = 1.78472$ | $\nu_4 = 25.71$ |
| $r_8 = 17.212$ | | |
| $d_8 = 15.00$ | | |
| $r_9 = -56.712$ | | |
| $d_9 = 14.50$ | $n_5 = 1.64769$ | $\nu_5 = 33.8$ |
| $r_{10} = -125.053$ | | |
| $d_{10} = 0.20$ | | |
| $r_{11} = 75.814$ | | |
| $d_{11} = 3.50$ | $n_6 = 1.7552$ | $\nu_6 = 27.51$ |
| $r_{12} = 1352.567$ | | | wherein reference symbols represent as follows:
$r_1$ through $r_{12}$: radii of curvature on the surfaces of the first through sixth lenses
$d_1$ through $d_{11}$: thicknesses of said lenses and air spaces therebetween
$n_1$ through $n_6$: refractive indices of said lenses
$\nu_1$ through $\nu_6$: Abbe's numbers of said lenses.

* * * * *